J. E. THROPP.
FABRIC LAYING ATTACHMENT FOR TIRE MAKING MACHINES.
APPLICATION FILED AUG. 9, 1917.

1,321,494.

Patented Nov. 11, 1919.
2 SHEETS—SHEET 1.

Inventor:

J. E. THROPP.
FABRIC LAYING ATTACHMENT FOR TIRE MAKING MACHINES.
APPLICATION FILED AUG. 9, 1917.
1,321,494.
Patented Nov. 11, 1919.
2 SHEETS—SHEET 2.
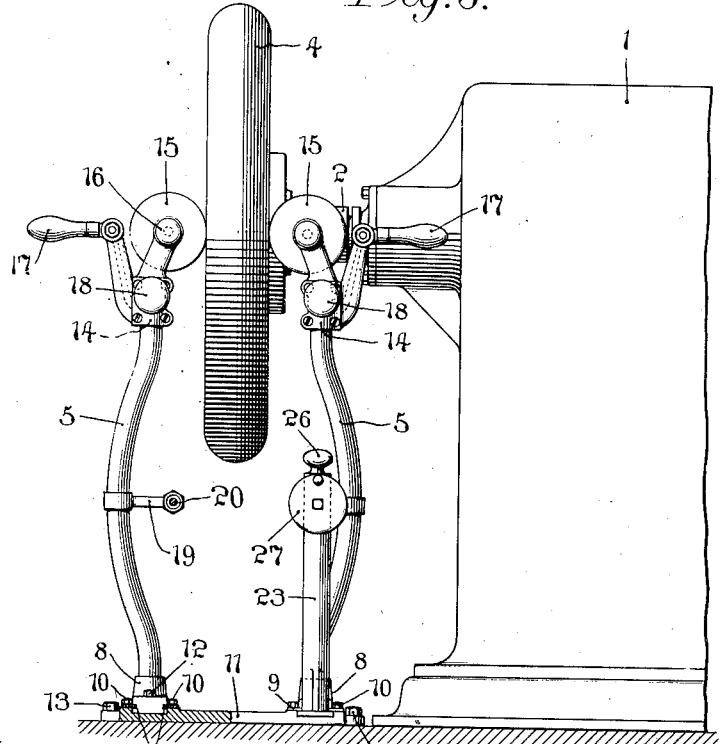
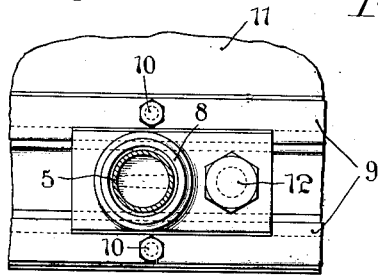
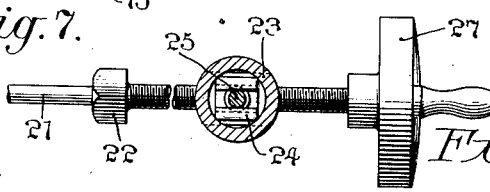
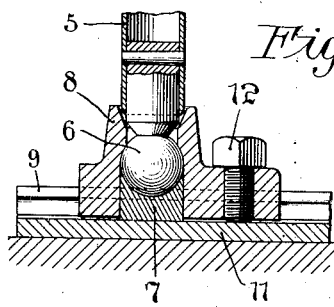
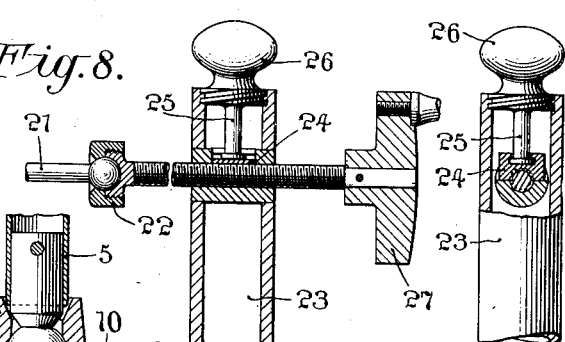
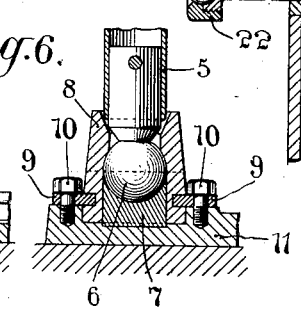
Inventor:
John E. Thropp
by his attorneys

UNITED STATES PATENT OFFICE.

JOHN E. THROPP, OF TRENTON, NEW JERSEY, ASSIGNOR TO THE DE LASKI AND THROPP CIRCULAR WOVEN TIRE COMPANY, OF TRENTON, NEW JERSEY, A CORPORATION OF NEW JERSEY.

FABRIC-LAYING ATTACHMENT FOR TIRE-MAKING MACHINES.

1,321,494.  Specification of Letters Patent.  Patented Nov. 11, 1919.

Application filed August 9, 1917. Serial No. 185,382.

*To all whom it may concern:*

Be it known that I, JOHN E. THROPP, a citizen of the United States, and resident of Trenton, in the county of Mercer and State of New Jersey, have invented a new and useful Improvement in Fabric-Laying Attachments for Tire-Making Machines, of which the following is a specification.

This invention relates to an improvement in fabric laying attachments for tire making machines, with the object in view of providing a device of this character which is exceedingly simple in construction, and facile and accurate in operation.

Another object is to provide such a device which may be used in connection with any kind of tire making machine having a rotating core.

A further object consists in providing such a device which is adapted for laying down the plies of fabric on every part of the exterior surface of the core and for laying down the plies of fabric both under and over the bead core.

A still further object consists in providing such a device which may be manipulated by hand during its operation, so as to utilize any particular skill which the operative may possess, and which has means for mechanically steadying and feeding the fabric laying tools during their operation.

A still further object consists in providing certain improvements in the form, construction and arrangement of the several parts whereby the above mentioned and other advantages may be effectively attained.

A practical embodiment of the invention is represented in the accompanying drawings, in which, Figure 1 represents a top plan view partly in section, of the complete device.

Fig. 3 represents an end view, partly in section, of the same,

Fig. 4 represents an enlarged detail plan view, partly in section, of the mounting of the stanchion.

Fig. 5 represents an enlarged detail section through the ball and socket mounting for the supporting arm.

Fig. 6 represents a similar view taken at right angles to Fig. 5.

Fig. 7 represents an enlarged detail plan view, partly in section, of the mechanism for steadying and feeding the supporting arm.

Fig. 8 represents a detail vertical section through the parts shown in Fig. 7, and Fig. 9 represents a detail vertical section through the parts shown in Fig. 8, taken at right angles to the latter.

Figure 1:
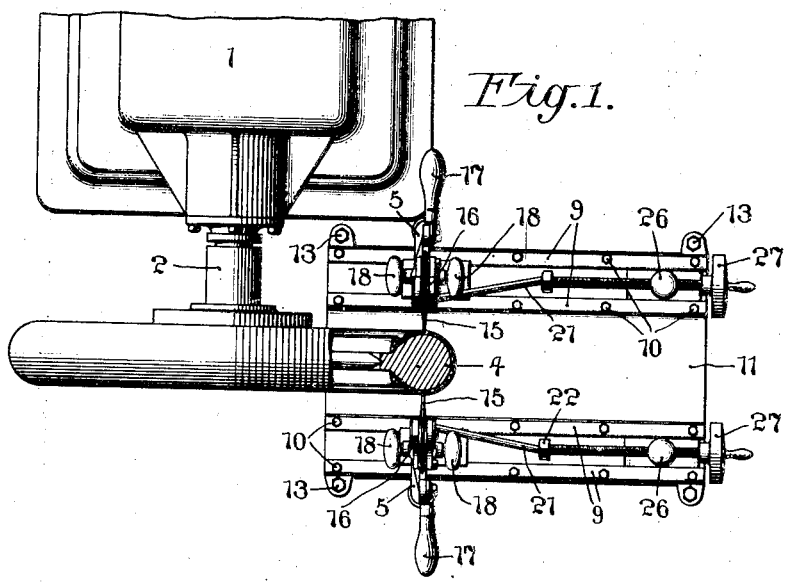

The reference numeral 1 denotes the casing of a tire making machine such, for instance, as that disclosed in United States Letters Patent to John E. Thropp, Peter D. Thropp and Albert de Laski, No. 1,119,326, dated December 1, 1914, and entitled "Machine for making or building up pneumatic tires."

A spindle 2 protrudes from the casing and carries a spider 3 for mounting a core 4, all as set forth in the said patent. It will be understood that suitable means (not shown) is provided for rotating the core 4, at desired speeds, and that appropriate means is also provided for applying the tire fabric to the periphery of the core 4 and for placing the beads of the tire in proper position.

The fabric laying attachment which forms the subject-matter of this invention consists of a pair of devices which are identical in structure and method of operation. Consequently, the construction of only one will be described in detail. It comprises a supporting arm 5, the lower end of which is provided with a ball 6 that is fitted to rest in a concave block 7 and be embraced by a sleeve 8, which latter also surrounds the block 7. The sleeve 8 is provided with lateral grooves for the reception of gibs 9 that are secured by cap screws 10 to a floor plate or guide 11. By this arrangement, the sleeve 8 and block 7, and hence the ball 6 of the arm 5, are adapted for sliding adjustment in the plate or guide 11. A set screw 12 may be operated to secure the parts in any desired position upon the guide 11.

Figure 2:
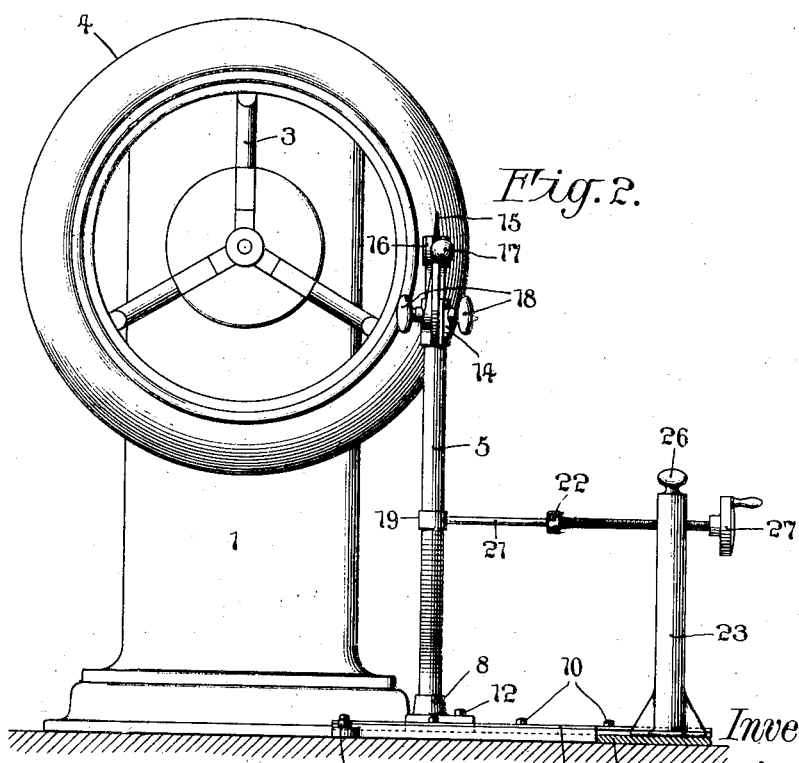
Fig. 2 represents a side view, partly in section, of the same.

It is intended that the floor plate or guide 11 shall be secured to the floor, or other foundation upon which the tire making machine rests, as clearly shown in Figs. 2 and 3, and to this end lag screws 13, or other suitable attaching devices, may be utilized.

Each arm 5 is preferably composed of a metallic tube, and its upper end is embraced by a head piece 14 which is bifurcated for the reception of a suitable fabric laying tool, such as a forming roll, which latter is preferably mounted in a ball bearing, as indicated at 16.

A rearwardly projecting handle 17 and laterally projecting knobs 18 are fitted to the head piece 14. It will be observed that each arm 5 is bent or bowed laterally outward from its ball and socket support, and each arm is provided with an intermediate laterally and inwardly extending bracket arm 19, the inner end of which is engaged by means of a ball and socket joint 20, with a steadying and feeding rod 21. The rod 21 consists of two parts which are connected by a ball and socket joint 22, and the outer part is passed through a stanchion 23, which is mounted at the outer end of the guide 11. This outer part of the rod 21 is exteriorly screw-threaded as clearly shown in the drawings, and is adapted for coöperative engagement with a half nut 24 that is carried by the lower end of a shank 25 which is secured to a knob 26 that has a screw-threaded engagement with the interior of the upper part of the stanchion 23.

From the above description it will be seen that the rotation of the knob 26 in one direction will bring the half nut 24 into engagement with the rod 21, while rotation of the knob 26 in the reverse direction will withdraw the nut from the said rod. The extremity of the rod 21 has a hand wheel 27 fixed thereto for manual operation of the same. When the half nut 24 is in engagement with the rod 21, the rotation of the hand wheel 27 will feed the rod forwardly or backwardly depending upon the direction of rotation. When the half nut 24 is withdrawn from the rod 21, the latter may be slid longitudinally in the stanchion 23 without the necessity of rotating the hand wheel 27.

In operation, after one or more strips of fabric have been suitably stretched upon the periphery of the core 4 in a well known and suitable manner, the operative may seize one of the fabric laying devices by its handle 17 and either knob 18 or 19, and force its forming roll 15 into engagement with the fabric, during the rotation of the core. As will be well understood by a workman skilled in this industry, the roll will first be applied to that part of the fabric which is adjacent the tread, and gradually worked inward radially across the surface of the core until it reaches the innermost part. As the core is rotating during this operation, the effect of the tool will be to lay the side of the fabric upon which it is operating smoothly against the core and in conformity therewith. After this has been accomplished upon one side of the core, the operation may be repeated upon the opposite side, and this may be continued until the tire is complete.

It will be noted that the arrangement which I have provided enables the angle at which the forming roll 15 engages the core, or fabric thereon, to be varied at will, so that it may be kept at all times at the most desirable angle to the work, which I believe to be substantially a right angle, and so that it may also be caused to operate upon all surfaces of the beads of the tire in order to lay the outer layers of the fabric firmly over and in contact with the beads.

In advancing the forming roll radially inward with respect to the core as just mentioned, the movement may be accomplished by the operator merely forcing the roll inwardly, while the half nut 24 is out of engagement with the rod 21, so that the latter is free to slide in the stanchion 23; or, this movement may be accomplished by engaging the half nut 24 with the rod 21, and then rotating the hand wheel 27 so as to advance the rod, and hence the forming roll, inwardly with respect to the core. In the latter case, as will be readily comprehended, the engagement of the feeding rod 21 with the half nut in the stanchion 23, serves to steady and regulate the inward movement of the forming roll.

When the device is being swung so as to change the angle at which the forming roll engages the fabric on the core, it will swing about the ball and socket joint 20 as a pivot and, therefore, since the said ball and socket joint is in a straight line between the ball 6 at the base of the arm 5 and the operating edge of the forming roll 15, this angular movement of the latter will be accomplished without changing the point of engagement between the forming roll and the fabric on the core. This feature is of great advantage in laying down the plies of fabric which pass over the bead cores, since the greatest changes in the working angle of the forming tool should take place at the time it reaches the heel or outer extremity of the bead, at which point it is highly desirable that the point of contact between the forming roll and the fabric should not be altered. Moreover, at all times it is desirable that the working angle of the forming roll may be changed without causing its operating edge to move rearwardly or feed back. By the arrangement I have devised, this change in angularity may be accomplished at any point during the operation and without stopping the rotation of the core or changing the speed thereof.

In case the operative so desires, the two sides of the fabric may be simultaneously laid down upon the core by the concurrent use of both devices, which may, under these circumstances, be grasped by the handles 17 only. In this last named operation, the half nuts 24 should be withdrawn from engagement with the feed rods 21.

It will be understood that various changes may be resorted to in the form, construction and arrangement of the several parts without departing from the spirit and scope of my invention; and hence I do not intend to be limited to the details herein shown and described except as they may be specifically included in the claims.

What I claim is:

1. A fabric laying attachment for a tire making machine having a rotary core comprising an upright movable arm, a fabric laying tool carried thereby, supporting means for one end of said arm, the said end of the arm having a universal mounting in the supporting means, means for grasping the arm to bring the tool into contact with the core, and means for steadying the arm during the operation of the tool.

2. A fabric laying attachment for a tire making machine having a rotary core comprising an upright movable arm, a fabric laying tool carried thereby, supporting means for one end of said arm, the said end of the arm having a universal mounting in the supporting means, means for grasping the arm to bring the tool into contact with the core, and means for steadying the arm and feeding the tool radially with respect to the core.

3. A fabric laying attachment for a tire making machine having a rotary core comprising an upright movable arm, a fabric laying tool carried thereby, supporting means for one end of said arm, the said end of the arm having a universal mounting in the supporting means, means for grasping the arm to bring the tool into contact with the core, a stanchion, and means engaging the stanchion and the arm for steadying the latter.

4. A fabric laying attachment for a tire making machine having a rotary core comprising a movable arm, a fabric laying tool carried thereby, supporting means for one end of said arm, the said end of the arm having a universal mounting in the supporting means, means for grasping the arm to bring the tool into contact with the core, a stanchion, a threaded rod engaging the arm and the stanchion, and a nut in the stanchion for mating the threads on the rod so that the rotation of the latter will cause longitudinal movement thereof for feeding the tool radially with respect to the core.

5. A fabric laying attachment for a tire making machine having a rotary core comprising a movable arm, a fabric laying tool carried thereby, supporting means for one end of said arm, the said end of the arm having a universal mounting in the supporting means, means for grasping the arm to bring the tool into contact with the core, a stanchion, a threaded rod engaging the arm and the stanchion, and a nut in the stanchion for mating the threads on the rod so that the rotation of the latter will cause longitudinal movement thereof for feeding the tool radially with respect to the core, said nut being movable out of engagement with the rod to permit the latter to slide in the stanchion.

6. A fabric laying attachment for a tire making machine having a rotary core comprising an upright movable arm, a fabric laying tool carried thereby, supporting means for one end of said arm, the said end of the arm having a universal mounting in the supporting means, means for grasping the arm to bring the tool into contact with the core, and means for steadying the arm, said last mentioned means engaging the arm at a point located in a straight line between the center of the universal mounting of the arm and the operating edge of the tool.

7. A fabric laying attachment for a tire making machine having a rotary core comprising an upright movable arm, a fabric laying tool carried thereby, supporting means for one end of said arm, the said end of the arm having a universal mounting in the supporting means, means for grasping the arm to bring the tool into contact with the core, a stanchion, and means for steadying the arm, the said last mentioned means engaging the stanchion and also engaging the arm at a point located in a straight line between the center of the universal mounting of the arm and the operating edge of the tool.

8. A fabric laying attachment for a tire making machine having a rotary core comprising an upright movable arm, a fabric laying tool carried thereby, supporting means for one end of said arm, the said end of the arm having a universal mounting in the supporting means, means for grasping the arm to bring the tool into contact with the core, a stanchion, and means for steadying the arm and for feeding the tool radially with respect to the core, said last mentioned means having a threaded engagement with the stanchion and engaging the arm at a point located in a straight line between the center of the universal mounting of the arm and the operating edge of the tool.

9. A fabric laying attachment for a tire making machine having a rotary core comprising a bent upright movable arm, a fabric laying tool carried thereby, supporting means for one end of said arm, the said end of the arm having a universal mounting in the supporting means, means for grasping the arm to bring the tool into contact with the core, a bracket projecting laterally from the arm, a stanchion, and means engaging the stanchion and the bracket for steadying the arm, the said point of engagement of the last named means with the bracket consisting of a universal joint and lying in a straight line between the center of the universal mounting of the arm and the operating edge of the tool.

In testimony, that I claim the foregoing as my invention, I have signed my name this 31st day of July, 1917.

JOHN E. THROPP.